(12) United States Patent
Harang et al.

(10) Patent No.: US 11,941,491 B2
(45) Date of Patent: Mar. 26, 2024

(54) METHODS AND APPARATUS FOR IDENTIFYING AN IMPACT OF A PORTION OF A FILE ON MACHINE LEARNING CLASSIFICATION OF MALICIOUS CONTENT

(71) Applicant: Sophos Limited

(72) Inventors: Richard Harang, Alexandria, VA (US); Joshua Daniel Saxe, Los Angeles, CA (US)

(73) Assignee: Sophos Limited, Abingdon (GB)

( * ) Notice: Subject to any disclaimer, the term of this patent is extended or adjusted under 35 U.S.C. 154(b) by 981 days.

(21) Appl. No.: 15/884,542

(22) Filed: Jan. 31, 2018

(65) Prior Publication Data
US 2019/0236490 A1     Aug. 1, 2019

(51) Int. Cl.
*G06N 20/00*     (2019.01)
*G06F 21/56*     (2013.01)
*G06F 16/80*     (2019.01)

(52) U.S. Cl.
CPC ............. *G06N 20/00* (2019.01); *G06F 21/56* (2013.01); *G06F 16/80* (2019.01); *G06F 2221/033* (2013.01); *G06F 2221/034* (2013.01)

(58) Field of Classification Search
CPC ......... G06N 20/00; G06F 21/56; G06F 16/80; G06F 2221/033; G06F 2221/034
See application file for complete search history.

(56) References Cited

U.S. PATENT DOCUMENTS

| | | |
|---|---|---|
| 7,069,589 B2 | 6/2006 | Schmall et al. |
| 7,204,152 B2 | 4/2007 | Woodward et al. |
| 7,219,148 B2 | 5/2007 | Rounthwaite et al. |
| 7,545,986 B2 | 6/2009 | Bachmann |

(Continued)

FOREIGN PATENT DOCUMENTS

| | | |
|---|---|---|
| CA | 2799691 C | 9/2014 |
| JP | 2012027710 A | 2/2012 |

(Continued)

OTHER PUBLICATIONS

Huihsin et al, U.S. Appl. No. 62/483,102, filed Apr. 7, 2017 (Year: 2017).*

(Continued)

*Primary Examiner* — Ryan C Vaughn
(74) *Attorney, Agent, or Firm* — COOLEY LLP

(57) ABSTRACT

In some embodiments, a non-transitory processor-readable medium stores code representing instructions to be executed by a processor. The code includes code to cause the processor to receive a structured file for which a machine learning model has made a malicious content classification. The code further includes code to remove a portion of the structured file to define a modified structured file that follows a format associated with a type of the structured file. The code further includes code to extract a set of features from the modified structured file. The code further includes code to provide the set of features as an input to the machine learning model to produce an output. The code further includes code to identify an impact of the portion of the structured file on the malicious content classification of the structured file based on the output.

25 Claims, 5 Drawing Sheets

(56) References Cited

U.S. PATENT DOCUMENTS

| | | | |
|---|---|---|---|
| 7,558,832 B2 | 7/2009 | Rounthwaite et al. | |
| 7,711,663 B2 | 5/2010 | Weng | |
| 7,769,772 B2 | 8/2010 | Weyl et al. | |
| 7,934,103 B2 | 4/2011 | Kidron | |
| 8,458,794 B1 | 6/2013 | Sallam | |
| 8,635,700 B2* | 1/2014 | Richard | G06F 21/564 |
| | | | 709/225 |
| 8,709,924 B2 | 4/2014 | Hanawa et al. | |
| 9,189,730 B1 | 11/2015 | Coenen et al. | |
| 9,404,833 B2 | 8/2016 | Stadlbauer et al. | |
| 9,465,940 B1 | 10/2016 | Wojnowicz et al. | |
| 9,514,391 B2 | 12/2016 | Perronnin et al. | |
| 9,531,742 B2 | 12/2016 | Kohout et al. | |
| 9,672,358 B1 | 6/2017 | Long et al. | |
| 9,680,868 B2 | 6/2017 | Bailey et al. | |
| 9,690,938 B1 | 6/2017 | Saxe et al. | |
| 9,721,097 B1 | 8/2017 | Davis et al. | |
| 9,792,492 B2 | 10/2017 | Soldevila et al. | |
| 9,807,113 B2 | 10/2017 | Yang et al. | |
| 9,864,956 B1 | 1/2018 | Sai | |
| 10,015,150 B2 | 7/2018 | Basin | |
| 10,193,902 B1* | 1/2019 | Caspi | G06F 21/564 |
| 10,521,587 B1 | 12/2019 | Agranonik et al. | |
| 10,599,844 B2 | 3/2020 | Schmidtler et al. | |
| 10,635,813 B2 | 4/2020 | Saxe et al. | |
| 10,742,591 B2 | 8/2020 | Nguyen et al. | |
| 10,834,128 B1 | 11/2020 | Rajagopalan et al. | |
| 10,956,477 B1 | 3/2021 | Fang et al. | |
| 11,003,774 B2 | 5/2021 | Saxe et al. | |
| 11,270,205 B2 | 3/2022 | Harang | |
| 11,321,607 B2 | 5/2022 | Shah et al. | |
| 11,409,869 B2 | 8/2022 | Schmidtler et al. | |
| 11,574,052 B2 | 2/2023 | Harang | |
| 11,609,991 B2 | 3/2023 | Saxe et al. | |
| 2006/0013475 A1 | 1/2006 | Philomin et al. | |
| 2009/0122718 A1 | 5/2009 | Klessig et al. | |
| 2009/0254992 A1 | 10/2009 | Schultz et al. | |
| 2009/0300765 A1 | 12/2009 | Moskovitch et al. | |
| 2013/0067579 A1* | 3/2013 | Beveridge | G06F 21/565 |
| | | | 726/24 |
| 2014/0090061 A1* | 3/2014 | Avasarala | G06F 21/564 |
| | | | 726/24 |
| 2014/0143869 A1 | 5/2014 | Pereira et al. | |
| 2015/0046850 A1* | 2/2015 | Kurabayashi | G06F 3/1431 |
| | | | 345/1.3 |
| 2015/0067853 A1 | 3/2015 | Amrutkar et al. | |
| 2015/0213376 A1 | 7/2015 | Ideses et al. | |
| 2015/0363294 A1 | 12/2015 | Carback, III et al. | |
| 2016/0065597 A1 | 3/2016 | Nguyen et al. | |
| 2016/0217368 A1 | 7/2016 | Ioffe et al. | |
| 2016/0218933 A1 | 7/2016 | Porras et al. | |
| 2016/0253500 A1 | 9/2016 | Alme et al. | |
| 2017/0046616 A1 | 2/2017 | Socher et al. | |
| 2017/0078317 A1 | 3/2017 | Gertner et al. | |
| 2017/0109615 A1 | 4/2017 | Yatziv et al. | |
| 2017/0212829 A1 | 7/2017 | Bales et al. | |
| 2017/0351948 A1 | 12/2017 | Lee et al. | |
| 2017/0372071 A1 | 12/2017 | Saxe et al. | |
| 2018/0060580 A1 | 3/2018 | Zhao et al. | |
| 2018/0121802 A1 | 5/2018 | Ruckauer et al. | |
| 2018/0129786 A1* | 5/2018 | Khine | G16H 40/67 |
| 2018/0137642 A1 | 5/2018 | Malisiewicz et al. | |
| 2018/0144242 A1 | 5/2018 | Simard | |
| 2018/0152471 A1* | 5/2018 | Jakobsson | G06Q 50/01 |
| 2018/0211041 A1 | 7/2018 | Davis | |
| 2018/0285740 A1 | 10/2018 | Smyth et al. | |
| 2018/0285773 A1 | 10/2018 | Hsiao et al. | |
| 2018/0288086 A1 | 10/2018 | Amiri et al. | |
| 2018/0293381 A1* | 10/2018 | Tseng | G06N 20/20 |
| 2019/0065744 A1 | 2/2019 | Gaustad | |
| 2019/0095805 A1* | 3/2019 | Tristan | G06N 20/20 |
| 2019/0108338 A1 | 4/2019 | Saxe et al. | |
| 2019/0132355 A1 | 5/2019 | Egbert et al. | |
| 2019/0205402 A1 | 7/2019 | Sernau et al. | |
| 2019/0236273 A1 | 8/2019 | Saxe et al. | |
| 2019/0258807 A1 | 8/2019 | DiMaggio et al. | |
| 2019/0266492 A1 | 8/2019 | Harang et al. | |
| 2019/0295114 A1 | 9/2019 | Pavletic et al. | |
| 2019/0347287 A1* | 11/2019 | Crossno | H04L 65/4084 |
| 2019/0378050 A1 | 12/2019 | Edkin et al. | |
| 2019/0387005 A1 | 12/2019 | Zawoad et al. | |
| 2020/0097817 A1 | 3/2020 | Harris et al. | |
| 2020/0104636 A1 | 4/2020 | Halevi et al. | |
| 2020/0117975 A1 | 4/2020 | Harang et al. | |
| 2020/0228998 A1 | 7/2020 | Bai et al. | |
| 2020/0250309 A1 | 8/2020 | Harang et al. | |
| 2020/0257799 A1 | 8/2020 | Saxe et al. | |
| 2020/0311586 A1 | 10/2020 | Sandstrom | |
| 2020/0342337 A1 | 10/2020 | Choudhary et al. | |
| 2021/0014247 A1 | 1/2021 | Wosotowsky et al. | |
| 2021/0073661 A1 | 3/2021 | Matlick et al. | |
| 2021/0092140 A1 | 3/2021 | Kazerounian et al. | |
| 2021/0120013 A1 | 4/2021 | Hines et al. | |
| 2021/0168165 A1 | 6/2021 | Alsaeed et al. | |
| 2021/0211450 A1 | 7/2021 | Aleidan | |
| 2021/0241175 A1 | 8/2021 | Harang et al. | |
| 2021/0326440 A1 | 10/2021 | Saxe et al. | |
| 2021/0328801 A1 | 10/2021 | Sly et al. | |
| 2021/0328969 A1 | 10/2021 | Gaddam et al. | |
| 2021/0397956 A1 | 12/2021 | Rasamsetti et al. | |
| 2022/0036194 A1 | 2/2022 | Sundaresan et al. | |
| 2022/0083900 A1 | 3/2022 | Khanna | |
| 2022/0124543 A1 | 4/2022 | Orhan et al. | |
| 2022/0353284 A1 | 11/2022 | Vörös et al. | |
| 2023/0089380 A1 | 3/2023 | Jiang et al. | |

FOREIGN PATENT DOCUMENTS

| | | |
|---|---|---|
| WO | WO 2007/117636 A2 | 10/2007 |
| WO | WO-2019071095 A1 | 4/2019 |
| WO | WO 2019/150079 A1 | 8/2019 |
| WO | WO-2019145912 A1 | 8/2019 |
| WO | WO 2019/166989 A1 | 9/2019 |
| WO | WO-2020030913 A1 | 2/2020 |
| WO | WO-2020157479 A1 | 8/2020 |
| WO | WO-2022223940 A1 | 10/2022 |

OTHER PUBLICATIONS

Tahan et al., "Mal-ID: Automatic Malware Detection Using Common Segment", 2012, https://www.jmlr.org/papers/volume13/tahan12a/tahan12a.pdf (Year: 2012).*

Kang et al., "Malware Classification Method via Binary Content Comparison", 2012 https://dl.acm.org/doi/pdf/10.1145/2401603.2401672 (Year: 2012).*

Cheplyaka, "Rank vs Order in R", 2016 https://ro-che.info/articles/2016-03-19-rank-vs-order-r (Year: 2016).*

Tseng et al., U.S. Appl. No. 62/483,102, filed Apr. 7, 2017 (Year: 2017).*

International Search Report and Written Opinion for International Patent Application No. PCT/US2018/054558, dated Dec. 10, 2018, 6 pages.

Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV], Mar. 22, 2016, 17 pages.

Saxe and Berlin, "Deep Neural Network Based Malware Detection Using Two Dimensional Binary Program Features," IEEE 2015,10th International Conference on Malicious and Unwanted Software: "Know Your Enemy" (Malware), 2015, pp. 11-20.

Saxe and Berlin, "eXpose: A Character-Level Convolutional Neural Network with Embeddings for Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.

Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.

(56) References Cited

OTHER PUBLICATIONS

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&__acm__=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

International Preliminary Report on Patentability for International Patent Application No. PCT/US2018/054558, dated Apr. 8, 2020, 5 pages.

International Search Report and Written Opinion for International Patent Application No. PCT/GB2019/050199, dated Mar. 29, 2019, 15 pages.

International Search Report and Written Opinion for International Patent Application No. PCT/IB2019/050642, dated Apr. 12, 2019, 12 pages.

International Search Report and Written Opinion for International Patent Application No. PCT/IB2019/051629, dated Jun. 17, 2019, 14 pages.

International Search Report and Written Opinion for International Patent Application No. PCT/GB2019/052222, dated Nov. 12, 2019, 17 pages.

International Search Report and Written Opinion for International Patent Application No. PCT/GB2020/050188, dated Mar. 31, 2020, 12 pages.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Narayanan, et al., "A multi-view context-aware approach to Android malware detection and malicious code localization." Empir Software Eng (2018); 23: 1222-1274. Epub Aug. 30, 2017.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Tian, et al., "An automated classification system based on the strings of trojan and virus families." Malicious and Unwanted Software (Malware); 2009 4th International Conference, Piscataway, NJ, USA, Oct. 13, 2009, pp. 23-30, 8 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Notice of Allowance in U.S. Appl. No. 15/727,035, dated Dec. 27, 2019, 7 pages.

Ribeiro, M. T., "LIME—Local Interpretable Model-Agnostic Explanations," [Online Blog], Retrieved from the Internet: <URL: https://homes.cs.washington.edu/~marcotcr/blog/lime/>, Apr. 2, 2016, 7 pages.

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Lundberg, S. M. et al., "A Unified Approach to Interpreting Model Predictions," 31st Conference on Neural Information Processing Systems (NIPS 2017), Long Beach, CA, USA, 10 pages.

Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.

Ba, et al., "Layer Normalization." [Online] Retrieved from the Internet https://arxiv.org/pdf/1607.06450.pdf>, Submitted on Jul. 21, 2016, 14 pages.

Harang, R. "Estimating weight sharing in multi-task networks via approximate Fisher information," SOPHOS, [Online] Retrieved from the Internet https://www.camlis.org/s/harang_CAMLIS17.pdf> Oct. 28, 2017, 31 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Kirkpatrick, J. et al., "Overcoming catastrophic forgetting in neural networks," PNAS (2017); 114 (13): 3521-3526.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent Learning." Center for Brains, Minds & Machines, Memo No. 057, [Online] Retrieved from the Internet https://arxiv.org/pdf/1610.06160.pdf>, Oct. 19, 2016, 21 pages.

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.

Santos and Torres, "Macro Malware Detection using Machine Learning Techniques—A New Approach." In Proceedings of the 3rd International Conference on Information Systems Security and Privacy (ICISSP 2017, Scitepress—Science and Technology Publications, Lda), pp. 295-302, ISBN: 978-989-758-209-7, ElevenPaths,

(56) References Cited

OTHER PUBLICATIONS

Telefónica Digital Cyber Security Unit, Madrid, Spain. [Online], Retrieved from the Internet on Nov. 19, 2018: http://www.scitepress.org/Papers/2017/61322, 8 pages.

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.

U.S. Appl. No. 16/257,749, Office Action dated Aug. 11, 2020, 14 pages.

U.S. Appl. No. 16/257,749, Notice of Allowance dated Mar. 1, 2021, 10 pages.

U.S. Appl. No. 15/884,542, Office Action dated Mar. 4, 2021, 53 pages.

U.S. Appl. No. 15/907,807, Office Action dated Apr. 27, 2021, 18 pages.

Augasta and Kathirvalavakumar, "Pruning algorithms of neural networks—a comparative study", Cent. Eur. J. Comp. Sci. (2013); 3(3): 105-115.

Chiba, et al., "Analyzing Spatial Structure of IP Addresses for Detecting Malicious Websites", Journal of Information Processing (Jul. 2013); 21(3): 539-550.

Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.

Kim, Hae-Jung, "Image-Based Malware Classification Using Convolutional Neural Network", In: Park J., Loia V., Yi G., Sung Y. (eds) Advances in Computer Science and Ubiquitous Computing. CUTE 2017, CSA 2017, Lecture Notes in Electrical Engineering (2017); vol. 474, pp. 1352-1357.

Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.

Pennington and Worah, et al., "The Spectrum of the Fisher Information Matrix of a Single-Hidden-Layer Neural Network", 32nd Conference on Neural Information Processing Systems (NeurIPS 2018), Montréal, Canada, pp. 1-16.

Shah, S., et al., "Virus Detection using Artificial Neural Networks; International Journal of Computer Applications", International Journal of Computer Applications (0975-8887) (Dec. 2013); vol. 84, No. 5, pp. 17-23.

Tu, M., et al., "Reducing the Model Order of Deep Neural Networks Using Information Theory", IEEE Computer Society (2016): 2016 IEEE Computer Society Annual Symposium on VLSI, pp. 93-98.

U.S. Appl. No. 16/263,264, Office Action dated Feb. 22, 2022, 13 pages.

Chiba, Daiki et al., "Detecting Malicious Websites by Learning IP Address Features", 2012 IEEE/IPSJ 12th International Symposium on Applications and the Internet, Jul. 16, 2012 (Jul. 16, 2012), pp. 29-39.

International Search Report and Written Opinion for International Application No. PCT/GB2022/050681, dated Jun. 20, 2022, 14 pages.

U.S. Appl. No. 16/158,844, Office Action dated May 24, 2022, 25 pages.

U.S. Appl. No. 16/853,803, Office Action dated May 2, 2022, 9 pages.

Xu, K., et al., "DeepRefiner: Multi-layer Android Malware Detection System Applying Deep Neural Networks," IEEE European Symposium on Security and Privacy, 2018, 15 pages.

U.S. Appl. No. 16/158,844, Advisory Action dated Jun. 6, 2023, 3 pages.

Buitinck, L., et al., "API design for machine learning software: experiences from the scikit-learn project", arXiv preprint (2013); 16 pages.

Dai, J., et al., "Efficient Virus Detection Using Dynamic Instruction Sequences", Journal of Computers (May 2009); 4(5): 405-414.

Devi, D. et al., "Detection of packed malware", SecurIT'12 (Aug. 17-19, 2012); p. 22.

Elovici, Yuv., et al., "Applying machine learning techniques for detection of malicious code in network traffic", KI 2007: Advances in Artificial Intelligence: 30th Annual German Conference on AI, KI 2007, Osnabrück, Germany (Sep. 10-13, 2007); Proceedings 30, Springer Berlin Heidelberg (2007); 44-50.

Henchiri, O., et al., "A feature selection and evaluation scheme for computer virus detection", Proceedings of the Sixth International Conference on Data Mining (ICDM'06), IEEE Computer Society (2006); 5 pages.

Joachims, T., "Making large-scale SVM learning practical LS-8 Report 24", Technical Report, University of Dortmund (1998); 18 pages.

Kecman, V., "Support vector machines-an introduction", StudFuzz, Springer-Verlag Berlin Heidelberg (2005); 177: 1-11.

Kolter, J. Z., et al., "Learning to detect and classify malicious executables in the wild", Journal of Machine Learning Research (2006); 7(12): 2721-2744.

Kolter, J. Z., et al., "Learning to detect malicious executables in the wild", Proceedings of the Tenth ACM SIGKDD International Conference on Knowledge Discovery and Data Mining (2004); 9 pages.

Menahem, E., et al., "Improving malware detection by applying multi-inducer ensemble", Computational Statistics & Data Analysis (2009); 53: 1483-1494.

Monnappa, K. A., "Introduction to Malware Analysis", Learning Malware Analysis: Explore the concepts, tools, and techniques to analyze and investigate Windows malware, Packt Publishing Ltd., Birmingham-Mumbai (2018); Chapter 1: pp. 7-10; Chapter 9: p. 362; 9 pages.

Mukkamala, S., et al., "Intrusion detection using an ensemble of intelligent paradigms", Journal of Network and Computer Applications (2005); 28(2): 167-182.

Russell, S. J., "Kernel Machines", Artificial Intelligence a Modern Approach, Pearson Education International (2010); Section 20(6): 749-751.

Sikorski, M., et al., "Practical malware analysis: the hands-on guide to dissecting malicious software", no starch press (2012); pp. 2-3; pp. 11-13; p. 384; 12 pages.

Souppaya, M., et al., "Guide to malware incident prevention and handling for desktops and laptops", NIST Special Publication 800-83 Revision 1 (2013); 47 pages.

U.S. Appl. No. 15/727,035, Office Action dated Aug. 14, 2019, 11 pages.

U.S. Appl. No. 15/907,807, Notice of Allowance dated Oct. 20, 2021, 5 pages.

U.S. Appl. No. 16/158,844, Office Action dated Jan. 4, 2023, 32 pages.

U.S. Appl. No. 16/263,264, Corrected Notice of Allowability dated Jan. 5, 2023, 2 pages.

U.S. Appl. No. 16/263,264, Notice of Allowance dated Oct. 4, 2022, 9 pages.

U.S. Appl. No. 16/853,803, Notice of Allowance dated Nov. 30, 2022, 7 pages.

U.S. Appl. No. 17/314,625, Corrected Notice of Allowability dated Mar. 29, 2023, 2 pages.

U.S. Appl. No. 17/314,625, Notice of Allowance dated Mar. 7, 2023, 10 pages.

Wang, T., et al., "Detecting unknown malicious executables using portable executable headers", 2009 Fifth International Joint Conference on INC, IMS and IDC. IEEE (2009); 1 page.

(56) References Cited

OTHER PUBLICATIONS

Wilding, ED., "The authoritative international publication on computer virus prevention, recognition and removal", Virus Bulletin (Nov. 1990); 24 pages.

Ye, Y., et al., "SBMDS: an interpretable string based malware detection system using SVM ensemble with bagging", Journal in Computer Virology (2009); 5: 283-293.

Ye, Y., et al., "Hierarchical associative classifier (HAC) for malware detection from the large and imbalanced gray list", Journal of Intelligent Information Systems (2010); 35: 1-20.

U.S. Appl. No. 16/158,844, Office Action dated Jun. 29, 2023, 35 pages.

U.S. Appl. No. 17/239,128, Office Action dated Jul. 12, 2023, 33 pages.

\* cited by examiner

METHODS AND APPARATUS FOR IDENTIFYING AN IMPACT OF A PORTION OF A FILE ON MACHINE LEARNING CLASSIFICATION OF MALICIOUS CONTENT

BACKGROUND

The embodiments described herein relate to methods and apparatus for machine learning classification of malicious content. More specifically, the methods, apparatus and systems described herein relate to identifying an impact of a portion of a file on the machine learning model classification of malicious content.

With rapid development in machine learning technology, many known systems are using machine learning models for various purposes. The machine learning models can be trained for performing different functions including analyzing data, identifying malicious content, classifying files and/or the like. More specifically, some known machine learning models can be trained to analyze a file for determining whether the file is malicious or not.

Often, however, it can be difficult to understand why the output of a machine learning model classifies data in a certain manner. Specifically, because of the complexity of many known machine learning models, it can be difficult to understand why a specific input to a machine learning model results in a certain output.

Thus, a need exists for improved methods and apparatus for identifying the impact of a portion of a file on a machine learning classification of malicious content.

SUMMARY

In some embodiments, a non-transitory processor-readable medium stores code representing instructions to be executed by a processor. The code includes code to cause the processor to receive a structured file for which a machine learning model has made a malicious content classification. The code further includes code to remove a portion of the structured file to define a modified structured file that follows a format associated with a type of the structured file. The code further includes code to extract a set of features from the modified structured file. The code further includes code to provide the set of features as an input to the machine learning model to produce an output. The code further includes code to identify an impact of the portion of the structured file on the malicious content classification of the structured file based on the output.

DETAILED DESCRIPTION

Figure 1:
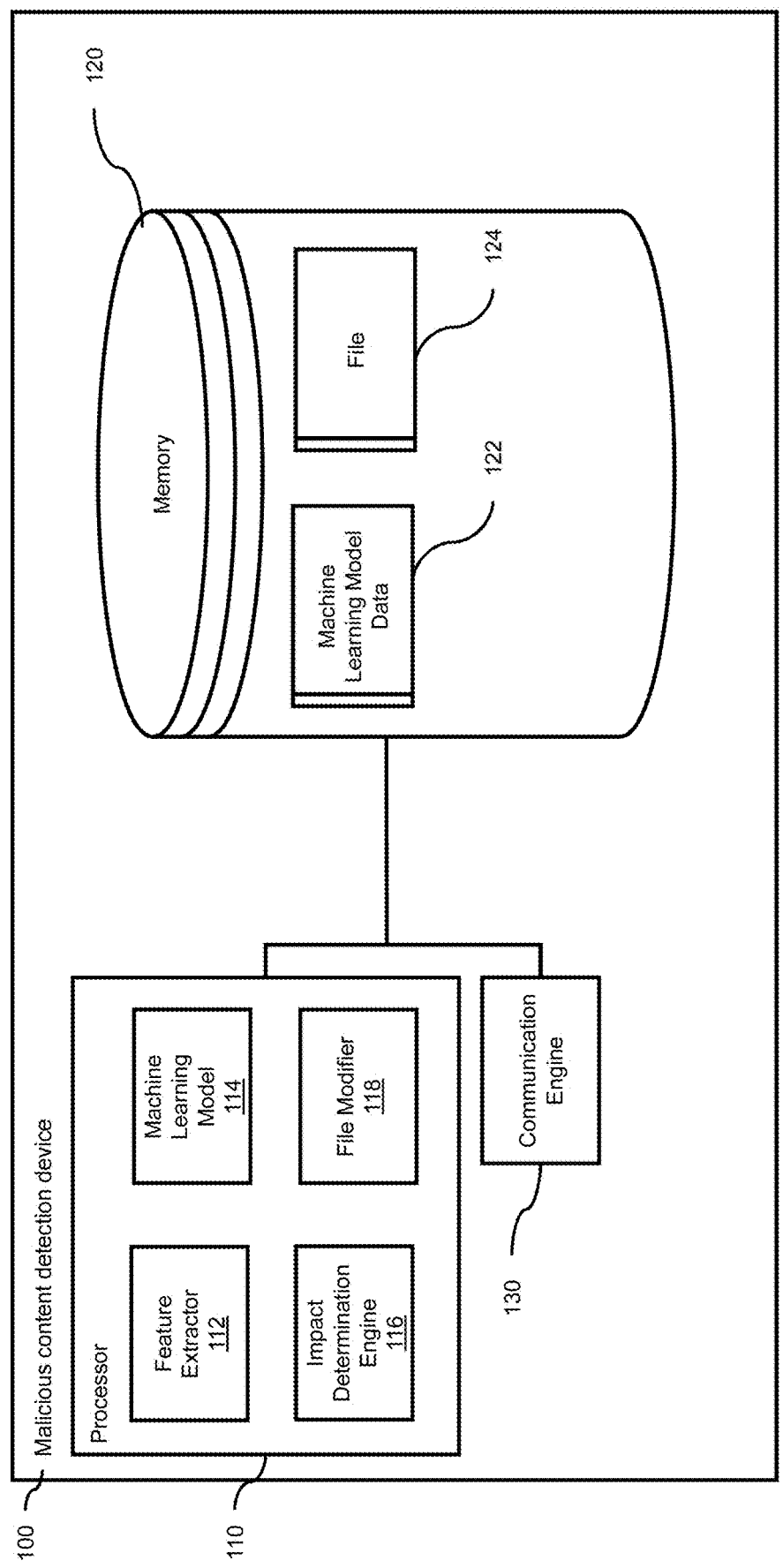
FIG. 1 is a schematic block diagram of a malicious content detection device, according to an embodiment.

In some embodiments, an apparatus includes a memory and a processor operatively coupled to the memory. The processor can be configured to receive a Hypertext Markup Language (HTML) file for which a machine learning model has made a malicious content classification. The processor can be configured to remove a subtree of the HTML file to define a modified HTML file having a valid HTML format. The processor can be configured to extract a set of features from the modified HTML file. The processor can be configured to provide the set of features as an input to the machine learning model to produce an output. The processor can be configured to identify an impact of the subtree of the HTML file on the malicious content classification of the HTML file based on the output, as well as the impact of any further subtrees contained within that subtree. The processor can be configured to store, in a database, an indication of the impact as associated with the subtree of the HTML file.

In other embodiments, a non-transitory processor-readable medium stores code representing instructions to be executed by a processor. The code includes code to cause the processor to receive a structured file for which a machine learning model has made a malicious content classification. The code further includes code to remove a portion of the structured file to define a modified structured file that follows a format associated with a type of the structured file. The code further includes code to extract a set of features from the modified structured file. The code further includes code to provide the set of features as an input to the machine learning model to produce an output. The code further includes code to identify an impact of the portion or portions (possibly overlapping and/or contained one within the other) of the structured file on the malicious content classification of the structured file based on the output.

In other embodiments, a method includes identifying, using a processor of a malicious content detection device, a set of structured portions within a structured file for which a machine learning model has made a malicious content classification. The method can include, for each structured portion from the set of structured portions: removing, using the processor, that structured portion from the structured file to define a modified structured file; extracting, using the processor, a set of features from the modified structured file; providing, using the processor, the set of features as an input to the machine learning model to produce an output; identifying, using the processor, an impact of that structured portion on the malicious content classification of the structured file based on the output; and storing, using the processor, an indication of the impact in a vector. The method can include ranking, using the processor and based on the vector, the set of structured portions based on the indication of the impact of each structured portion from the set of structured portions.

As used herein, the term "structured file" means a file having a systematic orderly arranged structure and/or syntax (e.g., required by a format and/or type of the file). The structured file can have a defined structure and/or a syntax that can be composed of multiple smaller units, objects, subtrees and/or elements. For example, a Hypertext Markup Language (HTML) file includes a structure of nested and/or hierarchical HTML elements (or subtrees) (for example, headers, paragraphs, line breaks, body, inputs, subtrees, comments and/or other HTML elements). Thus, an HTML file is a structured file. As another example, a file including program code in the 'C' programming language includes headers, variable definitions, routines, sub-routines, comments and/or the like, which define the structure of the file. Other examples of structured files include portable executables (PE), Microsoft® office documents (for example, Word®, Excel®, PowerPoint®, and/or the like), Android Package Kit (APK) files, Portable Document Format (PDF) files, and/or any other files having defined structure.

FIG. 1 illustrates a block diagram of a malicious content detection device 100, according to an embodiment. The malicious content detection device 100 can be a hardware-based computing device and/or a multimedia device, for example, a compute device, a server, a desktop compute device, a smartphone, a tablet, a laptop and/or the like. The malicious content detection device 100 includes a processor 110, a memory 120 and a communication engine 130.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a feature extractor 112, a machine learning model 114, an impact determination engine 116 and a file modifier 118. Each of the feature extractor 112, the machine learning model 114, the impact determination engine 116 and/or the file modifier 118 can be software stored in memory 120 and executed by processor 110 (e.g., code to cause the processor 110 to execute the feature extractor 112, the machine learning model 114, the impact determination engine 116 and/or the file modifier 118 can be stored in the memory 120) and/or a hardware-based device, for example, an ASIC, an FPGA, a CPLD, a PLA, a PLC and/or the like.

The feature extractor 112 can be configured to receive a structured file as an input and output a feature vector associated with the structured file. Similarly stated, the feature extractor 112 extracts features from the received structured file and forms a feature vector including indications of these features. More specifically, in some implementations, the feature extractor 112 identifies features in the structured file (for example, headers, variable definitions, routines, sub-routines, strings, elements, subtrees, tags and/or the like). A representation of these features can be used to define a feature vector. For example, the feature extractor 112 can normalize each feature and/or input each feature to a hash function to produce a hash value. The feature extractor 112, using the hash values, can form a feature vector (e.g., of pre-determined length and/or of variable length). For example, the hash value of each feature can identify a position and/or bucket in the feature vector and a value at that position and/or bucket in the feature vector can be incremented each time a hash value for a feature identifies that position and/or bucket. As another example, in other implementations, a value associated with that feature can be included in the feature vector at that position and/or bucket. In some instances, the positions and/or buckets to which each feature can potentially hash can be determined based on the length and/or size of that feature. For example, strings having a length within a first range can potentially hash to a first set of positions and/or buckets while strings having a length within a second range can potentially hash to a second set of positions and/or buckets. The resulting feature vector can be indicative of the features of the structured file.

For example, the feature extractor 112 can receive an HTML file and identify features within that HTML file (e.g., strings, elements, subtrees, tags, function calls, etc.). The feature extractor 112 can then provide each feature as an input to a hash function to generate a hash value for that feature. The feature extractor 112 can use the hash values to form a feature vector representative of and/or indicative of the features in the HTML file. Similar to an HTML file, the feature extractor 112 can receive a XML file and identify features (e.g., strings, elements, subtrees, tags, function calls, etc.) within that XML file.

The machine learning model 114 can be any suitable type of machine learning model, for example, a neural network, a decision tree model, a random forest model, a deep neural network and/or the like. The machine learning model 114 can be configured to receive a feature vector of a structured file and output an indication of whether the file is potentially malicious content. The machine learning model can provide an output indicating a malicious content classification of a structured file. The malicious content classification can include information regarding whether a structured file is classified as a threat. For example, the malicious content classification can classify a structured file into different categories, for example, benign, potentially malicious, malicious content, type of malicious content, class of malicious content, malware family and/or the like.

The impact determination engine 116 can be configured to compare various feature vectors and/or various malicious content classifications. In some instances, the impact determination engine 116 can be configured to compare the feature vector of a structured file and the feature vector of a modified structured file generated by removing a portion of the structured file, as described in further detail herein. Moreover, in some instances the impact determination engine 116 can be configured to compare the output of the machine learning model (e.g., the malicious content classification) for a structured file and the output of the machine learning model for a modified structured file defined based on the structured file. The impact determination engine 116 can perform a comparison (e.g., of the feature vectors and/or malicious content classifications) based on a nearest neighbor analysis, a distance based comparison (for example, Euclidean distance, Hamming distance, and/or the like), a statistical analysis, and/or any other suitable method used to compare two vectors and/or values. Based on the comparisons, the impact determination engine 116 can identify an impact of a structured portion on the malicious content classification of the structured file. The impact determination engine 116 can also identify an impact of one or more structured sub-portions of a portion of a file on the malicious content classification of the structured file, when the sub-portions are contained within the structured portion. The impact determination engine 116 can represent the output as numbers, percentages, proportions, ranks, graphs (for example, pie graph, bar graph, line graph, and/or the like), pictures and/or any other means of representation.

The file modifier 118 can be configured to identify at least one structured portion of a structured file and remove the structured portion from the structured file to define a modified structured file. In some instances, the modified structured file conforms with the structure, format and/or syntax dictated by a type of the structured file. Similarly stated, the modified structured file is a valid file of the same type as the structured file. For example, the file modifier 118 can modify a valid HTML file by removing a specific HTML element (e.g., between two associated tags) and form a new modified HTML file. The file modifier 118 modifies the HTML file such that the modified HTML file is still a valid HTML file. In another example, the file modifier 118 can modify a valid PE file by removing a basic block, for example, a header and/or a section (including virtual addresses, pointers to relocations and/or other elements of the section), and forming a modified PE file. The file modifier 118 modifies the PE file such that the modified PE is still a valid PE file. The modified PE can be processed to identify potential maliciousness (e.g., whether the PE file is malware) as described further herein. In some instances, the file modifier 118 can also add one or more structured portions to a structured file to define a modified structured file.

The memory 120 of the malicious content detection device 100 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 112, the machine learning model 114, the impact determination engine 116 and/or the file modifier 118). In some implementations, the memory 120 can be a portable memory (for example, a flash drive, a portable hard disk, and/or the like) that can be operatively coupled to the processor 110. In other instances, the memory can be remotely operatively coupled with the malicious content detection device. For example, a remote database server can be operatively coupled to the malicious content detection device.

The memory 120 can store machine learning model data 122 and file 124. The machine learning model data 122 can include data generated by the machine learning model 114 during processing of a structured file (for example, temporary variables, return addresses, and/or the like). The machine learning model data 122 can also include data used by the machine learning model 114 to process and/or analyze a structured file (for example, weights associated with the machine learning model, decision points associated with the machine learning model, and/or other information related to the machine learning model).

In some instances, the machine learning model data 122 can also include data used to train the machine learning model 114. In some instances, the training data can include multiple sets of data. Each set of data can contain at least one pair of an input file and an associated desired output value or label. The training data can include input files pre-categorized into categories, for example, malicious files and benign files. The training data can be used to train the machine learning model 122 to perform malicious content classification.

The file 124 can be a structured file. In some instances, the file 124 can be a file having a systematic orderly arranged structure. The file 124 can include a document, a spreadsheet, a presentation, a text file, an image file and/or the like. For example, in some instances, the file can be at least one of a Hypertext Markup Language (HTML) file(s), a JavaScript file(s), an Extensible Markup Language (XML) file, a Hypertext Preprocessor (PHP) file(s), portable executables (PE), Microsoft® Office documents (for example, Word®, Excel®, PowerPoint®, and/or the like), uniform resource locator (URL), Android Package Kit (APK) files, Portable Document Format (PDF) files, any other files having defined structure, and/or the like. The file 124 can include a software code, a webpage(s), a data file(s), a model file(s), a source file(s), a script(s), a process(es), a binary executable file(s), a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the file 124 can be analyzed by the processor 110 of the malicious content detection device 100 to identify whether the file is malicious, as described in further detail herein.

The communication engine 130 can be a hardware device operatively coupled to the processor 110 and memory 120 and/or software stored in the memory 120 executed by the processor 110. The communication engine 130 can be, for example, a network interface card (NIC), a Wi-Fi™ module, a Bluetooth® module and/or any other suitable wired and/or wireless communication device. Furthermore, the communication engine can include a switch, a router, a hub and/or any other network device. The communication engine 130 can be configured to connect the malicious content detection device 100 to a communication network (not shown in FIG. 1). In some instances, the communication engine 130 can be configured to connect to a communication network, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication engine 130 can facilitate receiving and/or transmitting a structured file through a communication network. In some instances, a received file can be processed by the processor 110 and/or stored in the memory 120 as described in further detail herein.

In use, the malicious content detection device 100 can be configured to receive a structured file 124 from a communication network (not shown in FIG. 1) via the communication engine 130 and/or via any other suitable method (e.g., via a removable memory device). The feature extractor 112, included in the processor 110, can be configured to receive the structured file 124 from the communication engine 130 and extract a set of features from the structured file 124 to define a feature vector. This feature vector and/or the set of features can be stored in the memory 120. The machine learning model 114 can retrieve the stored set of features from the memory 120 and analyze the feature vector. Based on the analysis, the machine learning model 114 can determine whether the structured file 124 is malicious (e.g., if a PE file is malware, if an HTML file includes malicious content, and/or the like) by outputting a malicious content classification. The processor 110 can store the malicious content classification of the structured file 124 in the memory 120.

The file modifier 118 can identify a structured portion in the structured file 124. The file modifier 118 can define a modified structured file by removing the identified structured portion from the structured file 124. The modified structured file can conform to the format and the syntactical validity of the structured file. The feature extractor 112 can extract a set of features from the modified structured file and define a feature vector for the modified structured file. The machine learning model 114 can use the feature vector as an input and output a malicious content classification for the modified structured file.

The impact determination engine 116 can compare the feature vector of the structured file and the feature vector of the modified structured file to identify a difference in the feature vectors. Additionally, the impact determination engine 116 can compare the output (e.g., malicious content classification) of the machine learning model 114 for the structured file with the output (e.g., malicious content classification) of the machine learning model 114 for the modified structured file. Based on the comparisons of the feature vectors and the malicious content classifications, the impact determination engine 116 can identify an impact of the structured portion on the malicious content classification of the structured file. For example, if the malicious content classification of the structured file is malicious and the malicious content classification of the modified structured file is benign, the impact determination engine can determine that some or all of the identified structured portion contributed to the malicious content classification of maliciousness. The impact determination engine 116 can store an indicator of the impact in the memory 120. By further decomposing the so-identified structured portion of the file, and generating additional modified structured files, the impact determination engine 116 can further improve its identification of which portions of the structured portion contributed to the malicious content classification of maliciousness. By examining files in which multiple modifications have been made, the impact determination engine 116 can determine if multiple indicators of maliciousness are distributed throughout the structured file.

As an example, the malicious content detection device 100 can receive an HTML file. The feature extractor 112 can extract a set of features from the received HTML file and store the set of features in the memory 120. The machine learning model 114 can retrieve the set of features from the memory 120 and perform a malicious content classification to determine whether the received HTML file is malicious. The malicious content detection device 100 can also store the malicious content classification in memory 120. The file modifier 118 can identify a structured portion between two associated tags (e.g., an HTML element and/or subtree) present in the HTML file. The file modifier 118 can form a modified HTML file by removing the identified structured portion. In some instances, since the entire element and/or subtree is removed, the modified HTML file is still a valid HTML file. In some instances, the file modifier 118 can remove multiple structured portions of a file. In some instances, the file modifier 118 can remove multiple structured portions contained within a single structured portion of a file. The modified HTML file then undergoes feature extraction using the feature extractor 112 and malicious content classification using the machine learning model 114. The impact determination engine 116 can compare the feature vector of the HTML file and the feature vector of the modified HTML file obtained by removing a portion of the structured file. The impact determination engine 116 can also compare the malicious content classification of the HTML file and the malicious content classification of the modified HTML file. Using these comparisons, the impact determination engine 116 can identify an impact on the outcome of the machine learning model 114. In some instances, the malicious content detection device 100 can send the result of whether the HTML file is malicious to another malicious content detection device, a remote server and/or the like using the communication engine 130.

Figure 2A:
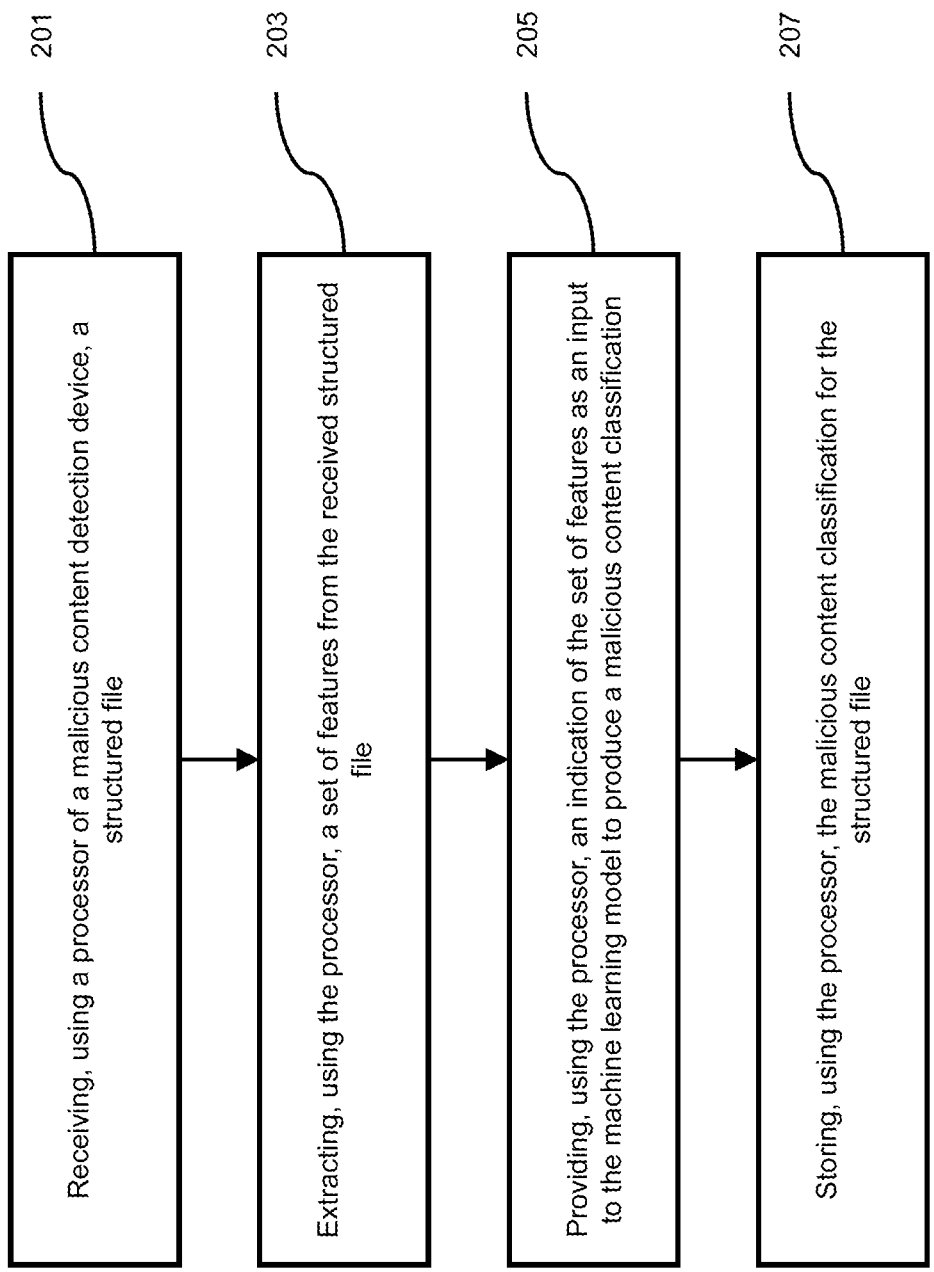
FIG. 2a is a flow chart illustrating a method for identifying malicious content using machine learning, according to an embodiment.

FIG. 2a is a flow chart illustrating a method for identifying malicious content using machine learning, according to an embodiment. The method of FIG. 2a can be executed using a processor of a malicious content detection device (e.g., similar to processor 110 of malicious content detection device 100 shown and described with respect to FIG. 1). At 201, the malicious content detection device can receive a structured file. The malicious content detection device can be configured to receive the structured file using a communication engine connected to a network (such as the Internet). For example, a malicious content detection device can receive an HTML file via a communication engine.

At 203, the malicious content detection device, using a feature extractor (e.g., similar to feature extractor 112 shown and described with respect to FIG. 1), can implement a feature extraction process. The feature extraction process can involve extracting a set of features from the received structured file. The set of features can include indications of characteristics and/or features of a structured file that can be used to identify a potential threat (e.g., malware threat). The set of features can be extracted as described with respect to the feature extractor 112 shown and described with respect to FIG. 1.

At 205, the processor provides an indication of the set of features (for example, a feature vector defined based on the set of features) as an input to a machine learning model (e.g., similar to machine learning model 114 shown and described with respect to FIG. 1). The machine learning model analyzes the indication of the set of features (or feature vector) to output a malicious content classification associated with the structured file. Specifically, the malicious content classification can be an indication of whether or not the machine learning model identified the structured file as malicious. At 207, the processor can store the malicious content classification for the structured file in a memory (e.g., memory 120 shown and described with respect to FIG. 1).

Figure 2B:
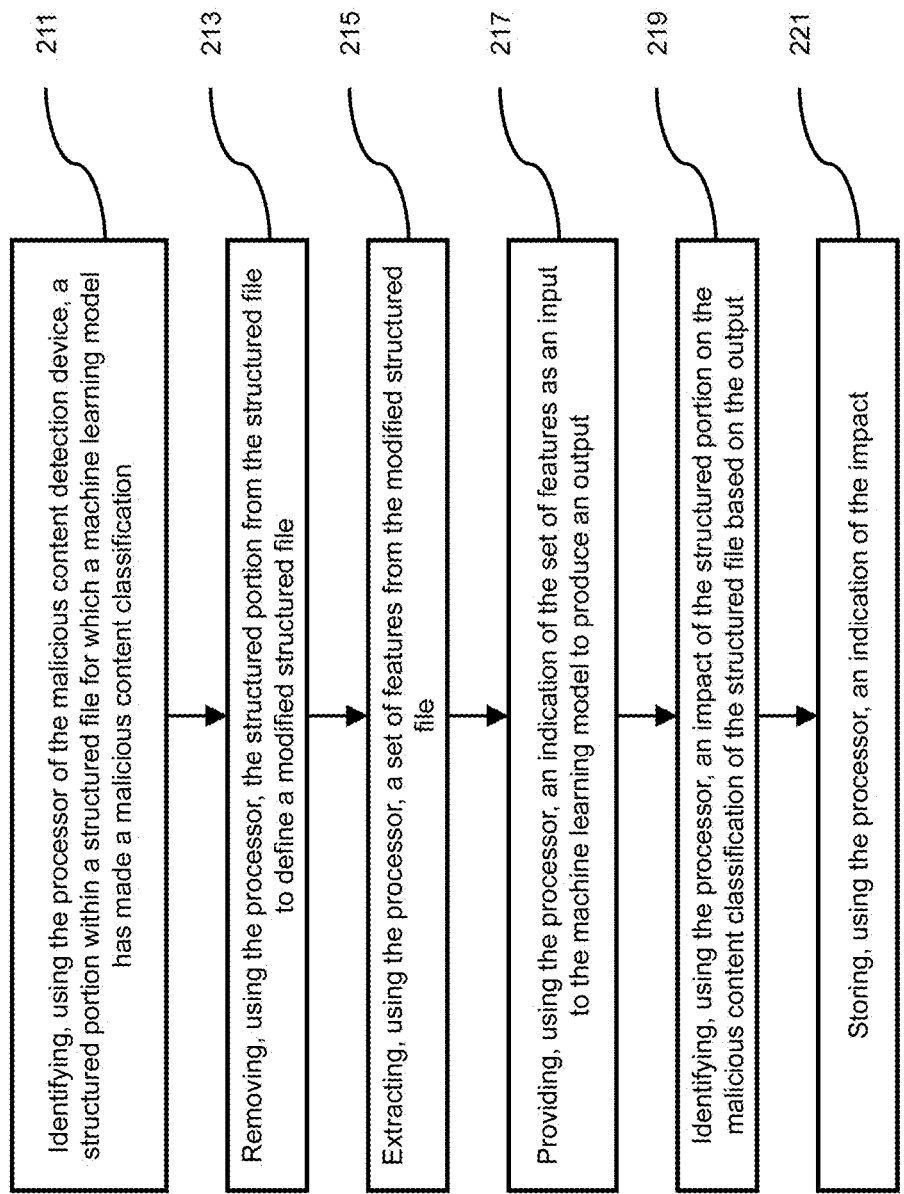
FIG. 2b is a flowchart illustrating a method for verifying machine learning classification of malicious content, according to an embodiment.

FIG. 2b is a flowchart illustrating a method for verifying a classification of malicious content using machine learning, according to an embodiment. The method involves analyzing an impact of a structured portion within a structured file for which a malicious content classification has been made (e.g., using the method of FIG. 2a). The method of FIG. 2b can be executed using a processor of a malicious content detection device (e.g., similar to processor 110 of malicious content detection device 100 shown and described with respect to FIG. 1).

The processor can execute the method of FIG. 2b after the machine learning model has completed the malicious content classification of a structured file (as described with respect to FIG. 2a). At 211, a file modifier (e.g., similar to file modifier 118 shown and described with respect to FIG. 1) can identify a structured portion within the structured file to remove from the structured file. For example, an HTML file can be identified to be malicious by the machine learning model. The processor can identify the structured portion within the HTML file to determine the impact the identified structured portion can have on the malicious content classification of the HTML file.

At 213, the file modifier can remove the identified structured portion from the structured file to define a modified structured file. In some instances, the modified structured file conforms with the structure and/or syntax dictated by a type of the structured file. Similarly stated, the modified structured file is a valid file of the same type as the structured file. For example, a file modifier 118 can modify a valid HTML file by removing a certain portion between two associated tags (e.g., an element and/or subtree) and form a new modified HTML file. The file modifier modifies the HTML file such that the modified HTML file is still a valid HTML file.

At 215, a feature extractor (e.g., similar to feature extractor 112 shown and described with respect to FIG. 1) can extract a set of features from the modified structured file. The extracted set of features can be stored in the memory.

At 217, a machine learning model (e.g., similar to machine learning model 114 shown and described with respect to FIG. 1) can retrieve the set of features from the memory. Based on an indication of the set of features (or feature vector) as an input to the machine learning model, the machine learning model can output a malicious content classification for the modified structured file. This output can be stored in the memory.

At 219, an impact determination engine (e.g., similar to impact determination engine 116 shown and described with respect to FIG. 1) can identify an impact of the structured portion of the structured file on the malicious content classification of the structured file. In some instances, the impact determination engine performs a comparison between the malicious content classification of the structured file and the malicious content classification of its modified structured file. Additionally, in some instances, the impact determination engine can perform a comparison between the feature vector of the structured file and the feature vector of the modified structured file. The impact determination engine can perform the comparison as described above with respect to FIG. 1.

At 221, the impact determination engine can store an indication of the impact in the memory. In some instances, the processor can be configured to notify a user, for example, an administrator and/or the like.

Figure 3:
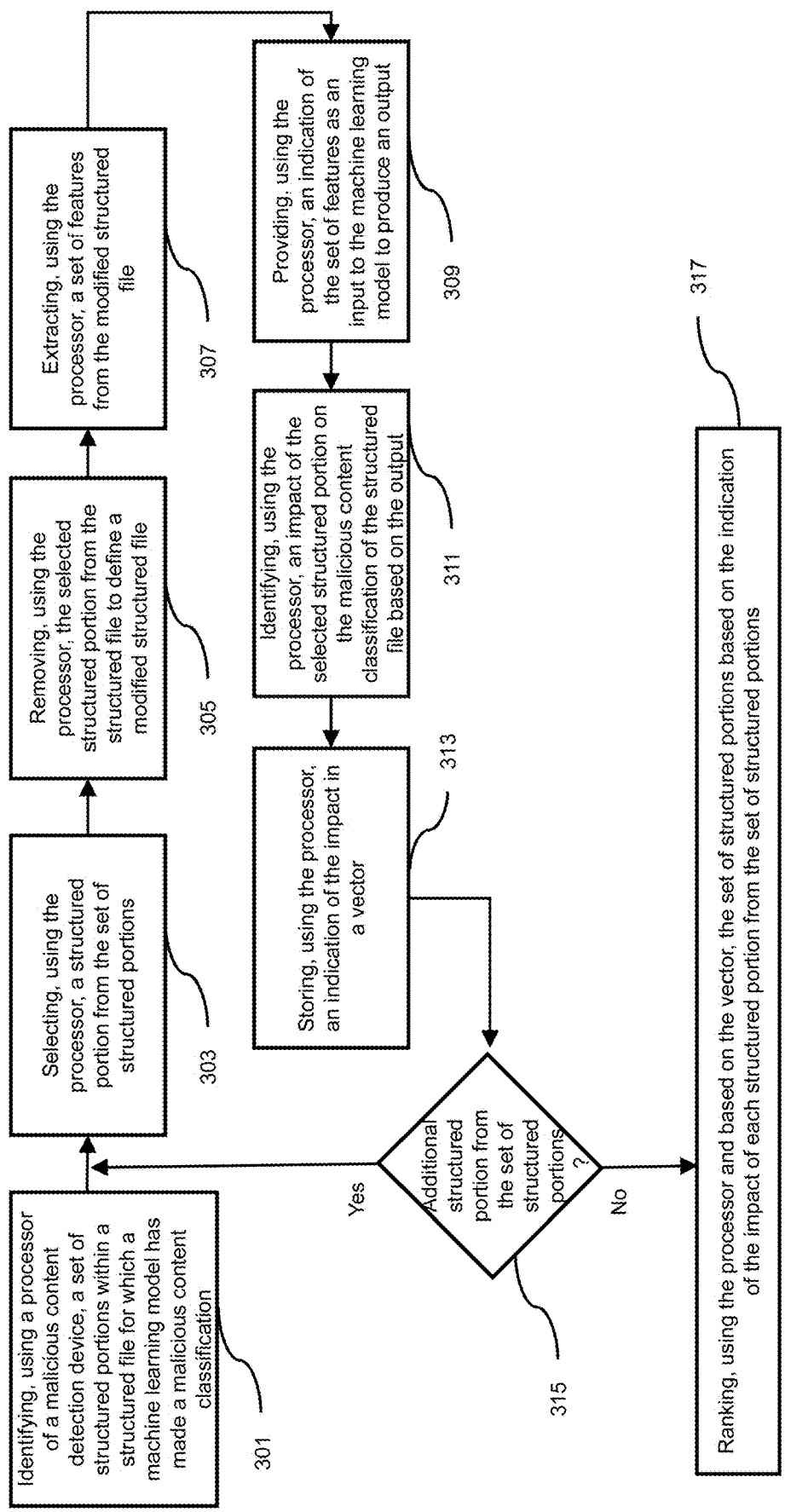
FIG. 3 is a flowchart illustrating a method for verifying machine learning classification of malicious content involving multiple structured portions within a structured file, according to an embodiment.

While shown and described above as removing a structured portion from a structured file, in some embodiments, a malicious content detection device can iteratively identify and remove multiple structured portions from a structured file to form multiple modified structured files to understand and/or determine an impact each of the structured portions has on the malicious content classification of the structured file. FIG. 3 is a flowchart illustrating a method for verifying machine learning classification of malicious content involving multiple structured portions within a structured file and then ranking the impact of the multiple structured portions, according to an embodiment.

At 301 (similar to step 211 of FIG. 2*b*), the malicious content detection device uses a processor to identify a set of structured portions within a structured file for which a machine learning model has made a malicious content classification (e.g., similar to the process shown and described with respect to FIG. 2*a*). The malicious content detection device can be configured to identify multiple structured portions within the structured file in parallel (e.g., all at once) and/or serially (e.g., after each one has been analyzed per steps 303-315 described below). In some instances, the malicious content detection device can identify the set of structured portions automatically and/or manually. In some implementations, automatic selection of the structured portions can include a processor identifying structured portions based on tags, elements, subtrees and/or the like that are often in malicious files. In other instances, the processor can identify structured portions based on a random—selection of tags, elements, subtrees and/or the like. In other implementations, manual identification can include providing the system administrator an interface in which the system administrator can manually select the set of structured portions within the structured file. In some instances, the identified structured portions can overlap and/or be mutually exclusive with the other identified structured portions. Thus, in such instances, a structured portion can encompass and/or include multiple other structured portions (e.g., a first structured portion can include a first subtree of an HTML file and a second structured portion can include a second subtree that is a portion of and/or contained within the first subtree). The processor can be configured to form a set including the identified structured portions.

At 303, the processor of the malicious content detection device selects a structured portion from the identified set of structured portions. At 305 (similar to step 213 in FIG. 2*b*), a file modifier (e.g., similar to file modifier 118 shown and described with respect to FIG. 1) of the malicious content detection device removes the selected structured portion from the structured file to define a modified structured file. At 307 (similar to step 215 in FIG. 2*b*), the feature extractor (e.g., similar to feature extractor 112 shown and described with respect to FIG. 1) of the malicious content detection device extracts a first set of features from the modified structured file. At 309 (similar to step 217 in FIG. 2*b*), the processor of the malicious content detection device provides an indication (e.g., a feature vector) of the first set of features as an input to the machine learning model. Based on the indication of the first set of features, the machine learning model then produces an output (e.g., malicious content classification) of the first modified structured file. At 311 (similar to step 219 in FIG. 2*b*), an impact determination engine (e.g., similar to impact determination engine 116 shown and described with respect to FIG. 1) can be configured to identify the impact of the selected structured portion on the malicious content classification of the structured file. At 313 (similar to as described in step 221 in FIG. 2*b*), the processor is then configured to store an indication of the impact of structured portion in a vector (e.g., in a memory).

At 315, the processor of the malicious content detection device determines whether there are additional identified structured portion(s) from the set of structured portions remaining to be processed. If there are additional identified structures, then the steps from 303 to 313 are repeated to obtain an indication of the impact of each remaining structured portion from the set of structured portions on the malicious content classification of the structured file. Such indications can be stored in the vector.

At 317, the processor ranks, based on the vector, the set of structured portions based on the indication of the impact of each structured portion from the set of structured portions. In some instances, the ranking can involve assigning numeric values based on the impact of each structured portion on the malicious content classification by the machine learning model of the structured file. In some instances, the ranking can include the relative maliciousness among the identified structured portions. In such an instance, the structured portions having a greater impact on the malicious content classification of the structured file can be ranked higher than those having less of an impact. As an example, the structured portions associated with feature vectors (e.g., the feature vectors produced when that structured portion is removed from the structured file) more different (e.g., based on a nearest neighbor comparison) from the feature vector of the structured file and/or the structured portions associated with a malicious content classification (e.g., the malicious content classification produced when that structured portion is removed from the structured file) different from (and/or more different from) the malicious content classification of the structured file can be identified as having more of an impact on the malicious content classification of the structured file than the other structured portions. In other instances, the ranking can be based on the size of the identified structured portions.

In some instances, the impact determination engine can identify specific aspects in the feature vectors that change from the feature vector of the structured file and represent the comparison in the form of a rank. The rank can be relative to the change between different modified feature vectors and the feature vector (that is between a the feature vector of a structured file and the feature vector of a modified structured file generated by removing a portion of the structured file), as described in further detail herein.

In some instances, the impact determination engine can rank the impact on the malicious content classification. For example, if the malicious content detection device identifies 10 structured portions, the impact determination engine can rank the most malicious structured portion as rank number 1 and the least malicious structured portion as rank number 10, where the increasing rank number indicates decreasing maliciousness.

Figure 4:
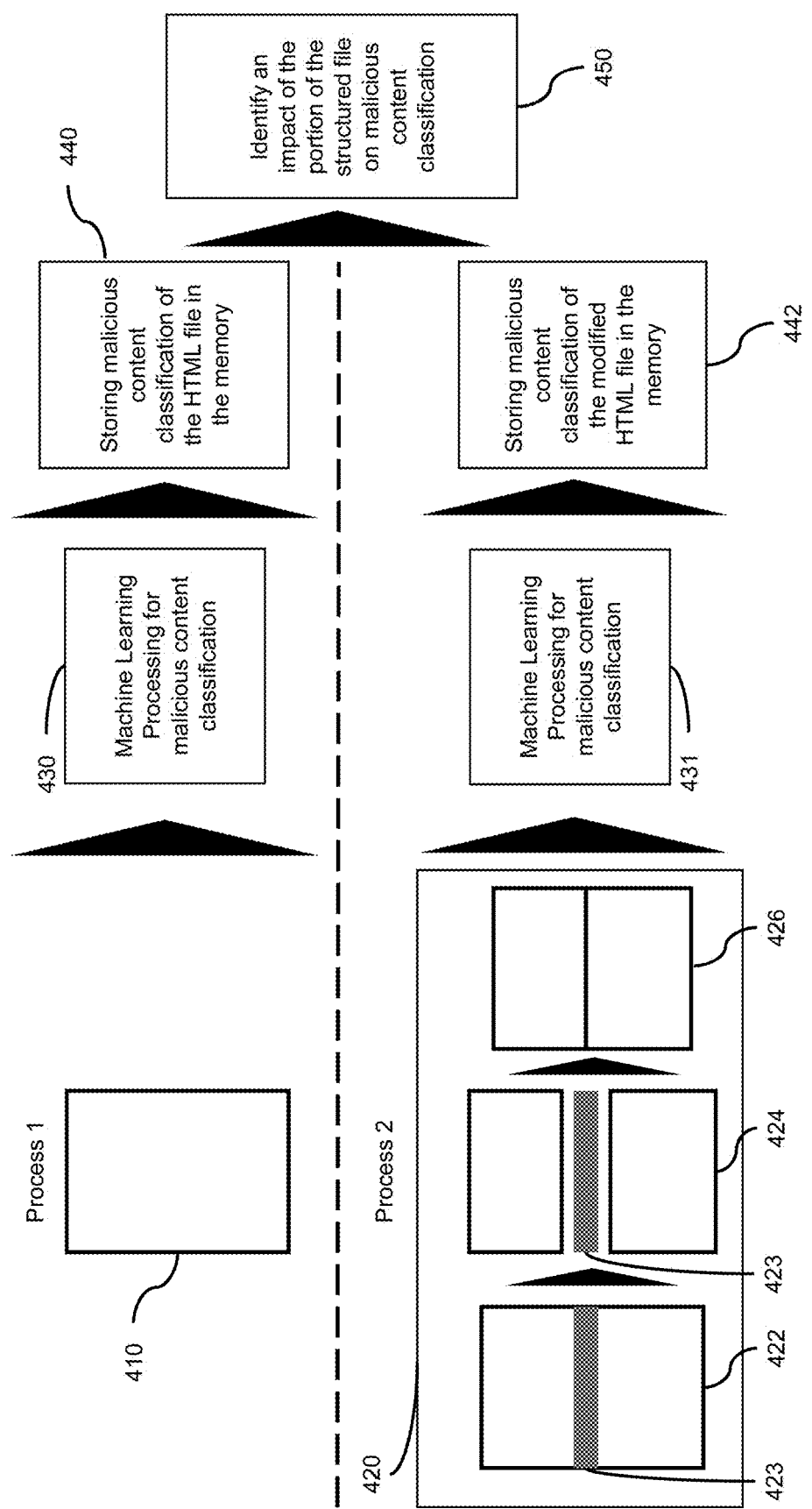
FIG. 4 is an example illustration of an HTML structured file, according to an embodiment.

FIG. 4 is an example illustration of an HTML structured file, according to an embodiment. FIG. 4 is divided into two processes, namely Process 1 and Process 2.

Process 1 involves, at 410, an HTML file undergoing, at 430, machine learning processing for malicious content classification. At 440, the malicious content classification of the HTML file is stored in memory. Process 2 involves, at 420, defining a modified HTML file. This includes, at 422, a structured portion 423 being identified within the HTML file; at 424, the identified structured portion 423 being removed from the HTML file; and at 426, a modified HTML file having a valid HTML format being defined without the structured portion 423. At 431, the modified HTML file undergoes machine learning processing for malicious content classification. At 442, the malicious content classification of the modified HTML file is stored. At 450, an impact of the portion of the structured file on malicious content classification is identified.

In other embodiments, the feature extractor, the machine learning model, the impact determination engine and/or the file modifier can be part of and/or executed by external hardware devices operatively coupled to the processor (e.g., via a network). Similarly stated, while shown and described with respect to FIG. 1 as being executed within a malicious content detection device 100, in other instances, the methods and/or processes described herein can be performed across multiple devices (e.g., via a network). As an example, the feature extractor can be executed at a device different from a device that executes the impact determination engine, the machine learning model and/or the file modifier.

While shown and described above as analyzing a structured file, in other instances, a malicious content detection device can process any structured data. The term "structured data" means data having a systematic orderly arranged structure and/or syntax (e.g., required by a format and/or type of the data). The structured data can have a defined structure and/or a syntax that can be composed of multiple smaller units, objects and/or elements. The structured data can be, for example, a structured file, a uniform resource locator (URL), a network address, an Internet Protocol (IP) address, a Media Access Control (MAC) address, and/or the like.

In other instances, a malicious content detection device can be configured to identify and remove multiple structured portions within the structured file to define a modified structured file. The multiple structured portions removed can be overlapping and/or mutually exclusive. Thus, in such instances, a structured portion can encompass and/or include multiple other structured portions and the impact can be analyzed based on the combination of such structured portions.

In some instances, an impact determination engine in a machine learning model (e.g., similar to machine learning model 114 as described with respect to FIG. 1) can identify, based on the ranking, at least one structured portion from the set of structured portions as a malicious structured portion. The impact determination engine can compare using a distance between the feature vectors of the modified structured files and the feature vector of the structured file to determine maliciousness of structured portions removed from the modified structured files. In other instances, the impact determination engine can compare impacts of each of the structured portions on the malicious content classification of the structured file.

While shown and described above as determining an impact of a structured portion on the malicious content classification of a structured file, in other instances a malicious content detection device (e.g., similar to malicious content detection device 100 shown and described with respect to FIG. 1) can be used to confirm and/or verify the correct operation of a machine learning model. Specifically, if a structured portion of a structured file is known to be the malicious portion of that structured file, the structured portion can be removed from the structured file to define a modified structured file and the machine learning model can analyze an indication of a set of features of the modified structured file to produce a malicious content classification. Given that the malicious structured portion was not included in the modified structured file, the machine learning model should output a malicious content classification of benign. Similarly, if a structured portion of a malicious file is known to be benign, this structured portion can be removed and the machine learning model tested on the modified structured file to determine whether the malicious content classification remains malicious.

In some instances, a malicious content detection device (e.g., similar to malicious content detection device 100 shown and described with respect to FIG. 1) can be used to confirm and/or verify the correctness of the extracted feature vector from a structured file and the extracted feature vector of a modified structured file defined by removing a structured portion from the structured file. An impact determination engine (e.g., similar to impact determination engine 116 shown and described with respect to FIG. 1) can compare the feature vectors of the structured file and the modified structured file based on a nearest neighbor analysis, a distance based comparison, a statistical analysis, and/or any other suitable method used to compare two vectors. For example, after comparison, if the distance between the feature vector of the structured file and the feature vector of modified structured file is below a certain value (e.g., a threshold), then both the feature vectors may likely have a similar malicious content classification. This means that the removed structured portion may not have a significant impact in the malicious content classification of the structured file. If the distance between the feature vector of the structured file and the feature vector of modified structured file is higher than certain value, then both the feature vectors may potentially have different malicious content classifications. This means that the removed structured portion may have a significant impact in the malicious content classification of the structured file. Thus, the comparison of feature vectors may help in determining whether the structured portion is malicious content or not. Additionally, this comparison can provide insight into the impact removing a structured portion has on the feature vector, and thus the input to a machine learning model.

In some instances, an impact determination engine (e.g., similar to impact determination engine 116 shown and described with respect to FIG. 1) can classify a structured portion within the file as malicious based on the impact of the structured portion on the malicious content classification. For example, a structured file can be identified to be malicious content by the machine learning model. The file modifier can then remove a structured portion within the structured file to define a modified file. The feature extractor extracts a set of features from the modified structured file. Using the methods described above, the machine learning model produces an output indicating the modified file to be benign. The impact determination engine can then identify the structured portion to be a malicious portion of the structured file. The structured portion can then be stored and used to analyze other files to determine maliciousness. Moreover, in some instances, a combination of one or more structured portions may cause the structured file to be identified as malicious content. In such an instance, the impact determination engine can store the identified combination and can use this identified combination to analyze other files to determine maliciousness.

While shown and described above as removing structured portions from a structured file, in some instances a file modifier (e.g., similar to file modifier 118 shown and described with respect to FIG. 1) can add a structured portion to a structured file to define a modified structured file having a valid format. The added structured portion can be known to be malicious (and/or benign) and can be added to determine whether the machine learning model is operating correctly for the classification of a certain type of malicious content. For example, the machine learning model can be trained to classify a new type of malicious content and/or additional code as malicious content by adding such code to benign files. In other instances, the known structured portion can be added to determine false negatives (and/or false positives) associated with the machine learning model.

Further, in other instances, the added structured portion is not known to be malicious (and/or benign) and is added to one or more structured files to verify whether the structured portion is malicious (and/or benign). For example, if a file modifier adds the structured portion to multiple otherwise benign files and the modified files are identified as malicious, the structured portion can be classified as malicious (and stored and used for future reference and/or classification).

Furthermore, an impact determination engine can classify the structured portion as malicious based on both the removal of the structured portion from a first structured file and the addition of the structured portion to a second structured file. More specifically, if a structured portion is removed from the first structured file (initially identified as malicious) and a resulting modified structured file is identified as benign and the structured portion is added to the second structured file (initially identified as benign) and a resulting modified structured file is identified as malicious, the structured portion can be identified to be malicious. For example, a file modifier can remove a subtree to a first HTML file to define a first modified HTML file and add the subtree to a second HTML file to define a second modified HTML file. The impact determination engine can determine whether the subtree is malicious based on the impact of the subtree on the malicious content classification of the first modified HTML file and the second HTML file.

In some instances, a malicious content detection device (e.g., similar to malicious content detection device 100 of FIG. 1) can store the impact of a structured portion of a structured file in a database and/or memory. In such instances, the stored impact can be used to train a machine learning model. For example, if the structured portion is identified to be malicious then the malicious content detection device can include the structured portion in the training data, which can be used to train the machine learning model to identify similar structured portions in other structured files. Moreover, the stored impact can be used to train the machine learning model to classify files having similar structured portions as malicious.

In some instances, training data can be stored in a memory (e.g., the memory 120 of FIG. 1). The training data can include multiple sets of data and each set of data can contain at least one pair of an input file and an associated desired output value. The training data can include input files as both malicious files and benign files. The training data can be used to train a machine learning model (e.g., machine learning model 114). The training data can, for example, include a set of files used to optimize and/or improve parameters (for example, weights of neurons in a neural network) of the classifier used in the machine learning model. The training data can be modified by the processor by adding new data and/or deleting existing data.

While various embodiments have been described above, it should be understood that they have been presented by way of example only, and not limitation. Where methods and/or schematics described above indicate certain events and/or flow patterns occurring in a certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
   a memory; and
   a processor operatively coupled to the memory, the processor configured to receive a Hypertext Markup Language (HTML) file, the processor configured to extract a set of features from the HTML file,
   the processor configured to provide an indication of the set of features extracted from the HTML file as a first input to a machine learning model to produce a first malicious content classification,
   the processor configured to remove a subtree of the HTML file to define a modified HTML file, the modified HTML file having a valid HTML format and being interpretable,
   the processor configured to extract a set of features from the modified HTML file, the processor configured to provide an indication of the set of features extracted from the modified HTML file as a second input to the machine learning model to produce a second malicious content classification, the second malicious content classification being made by the same machine learning model as the first malicious content classification and for the modified HTML file defined by the removal of the subtree from the HTML file,
   the processor configured to determine a difference between the first malicious content classification and the second malicious content classification based on a distance measure,
   the processor configured to identify an impact of the subtree of the HTML file on the first malicious content classification of the HTML file based on the difference between the first malicious content classification and the second malicious content classification,
   the processor configured to store, in a database, an indication of the impact as associated with the subtree of the HTML file.

2. The apparatus of claim 1, wherein the machine learning model is at least one of a neural network, a decision tree model, a random forest model or a deep neural network.

3. The apparatus of claim 1, wherein the distance measure is a first distance measure, and the processor is configured to identify an impact of the subtree of the HTML file on at least one of the first input or the second input to the machine learning model by determining a difference between the indication of the set of features extracted from the HTML file and defining a first feature vector and the indication of the set of features extracted from the modified HTML file and defining a second feature vector, the difference between the first feature vector and the second feature vector being based on a second distance measure.

4. The apparatus of claim 1, wherein the processor is configured to classify the subtree as malicious based on the impact.

5. The apparatus of claim 4, wherein the processor is further configured to initiate an action based on the classification of the subtree as malicious.

6. The apparatus of claim 1, wherein the HTML file is a first HTML file and the modified HTML file is a first modified HTML file,
   the processor configured to add the subtree to a second HTML file to produce a second modified HTML file, the processor configured to extract a set of features from the second modified HTML file, the processor configured to provide an indication of the set of features from the second modified HTML file as a third input to the machine learning model to produce a third malicious content classification,
   the processor configured to identify an impact of the subtree on the third malicious content classification, the third malicious content classification being made by the machine learning model and for the second modified HTML file,
   the processor configured to classify the subtree as malicious based on (1) the impact of the subtree on the first malicious content classification for the first HTML file and (2) the impact of the subtree on the third malicious content classification for the second modified HTML file.

7. The apparatus of claim 1, wherein the processor is configured to produce the indication of the set of features extracted from the modified HTML file by providing as an input to a hash function each feature from the set of features in the modified HTML file to produce the indication of the set of features extracted from the modified HTML file.

8. A non-transitory processor-readable medium storing code representing instructions to be executed by a processor, the code comprising code to cause the processor to:
   receive a structured file;
   extract a set of features from the structured file;
   provide an indication of the set of features extracted from the structured file as a first input to a machine learning model to produce a first malicious content classification;
   remove a portion of the structured file to define a modified structured file, the modified structured file following a format associated with a type of the structured file;
   extract a set of features from the modified structured file;
   provide an indication of the set of features extracted from the modified structured file as a second input to the machine learning model to produce a second malicious content classification, the second malicious content classification being made by the same machine learning model as the first malicious content classification and for the modified structured file defined by the removal of the portion of the structured file;
   determine a difference between the first malicious content classification and the second malicious content classification based on a distance measure; and identify an impact of the portion of the structured file on the first malicious content classification based on the difference between the first malicious content classification and the second malicious content classification.

9. The non-transitory processor-readable medium of claim 8, wherein the structured file is at least one of a Hypertext Markup Language (HTML) file, an Extensible Markup Language (XML) file, a Portable Executable (PE) file, a document processing file, or a Portable Document Format (PDF) file.

10. The non-transitory processor-readable medium of claim 8, wherein the portion of the structured file is a Hypertext Markup Language (HTML) subtree or an Extensible Markup Language (XML) subtree.

11. The non-transitory processor-readable medium of claim 8, wherein the machine learning model is at least one of a neural network, a decision tree model, a random forest model or a deep neural network.

12. The non-transitory processor-readable medium of claim 8, wherein the distance measure is a first distance measure, the code further comprising code to cause the processor to:
identify an impact of the portion of the structured file on at least one of the first input or the second input to the machine learning model by determining a difference between a first feature vector and a second feature vector, the indication of the set of features extracted from the structured file defining the first feature vector and the indication of the set of features extracted from the modified structured file defining the second feature vector.

13. The non-transitory processor-readable medium of claim 8, further comprising code to cause the processor to:
define the indication of the set of features extracted from at least one of the structured file or the modified structured file by providing, as an input to a hash function, each feature from the set of features extracted from the at least one of the structured file or the modified structured file to produce the indication of the set of features extracted from the at least one of the structured file or the modified structured file.

14. The non-transitory processor-readable medium of claim 8, further comprising code to cause the processor to:
classify the portion of the structured file as malicious based on the impact of the portion of the structured file on the first malicious content classification.

15. The non-transitory processor-readable medium of claim 14, further comprising code to cause the processor to:
notify a user of the classification of the portion of the structured file as malicious.

16. The non-transitory processor-readable medium of claim 8, further comprising code to cause the processor to:
classify the portion of the structured file as associated with an identified maliciousness type based on the impact of the portion of the structured file on the first malicious content classification.

17. The non-transitory processor-readable medium of claim 8, wherein the portion s a first portion from a set of portions of the structured file, the code comprising code to cause the processor to:
identify an impact of a second portion of the structured file on the first malicious content classification based on a difference between the first malicious content classification and a third malicious content classification, the third malicious content classification generated by the machine learning model in response to providing as a third input an indication of a set of features extracted from a second modified structured file, the second modified structured file defined by removing the second portion from the structured file;
generate a first indicator of maliciousness of the structured file based on the impact of the first portion of the structured file on the first malicious content classification;
generate a second indicator of maliciousness of the structured file based on the impact of the second portion of the structured file on the first malicious content classification;
initiate an action based on a determination of multiple indicators of maliciousness, based on the first indicator of maliciousness of the structured file and the second indicator of maliciousness of the structured file.

18. A method, comprising:
identifying, using a processor of a malicious content detection device, a set of structured portions within a structured file;
extracting, using the processor, a set of features from the structured file;
providing, using the processor, an indication of the set of features extracted from the structured file as an input to a machine learning model to produce a first malicious content classification, the set of structured portions being such that a removal, from the structured file, of each structured portion from the set of structured portions is configured to generate a modified structured file that is valid and interpretable;
for each structured portion from the set of structured portions:
removing, using the processor, that structured portion from the structured file to define a modified structured file;
extracting, using the processor, a set of features from the modified structured file;
providing, using the processor, an indication of the set of features extracted from the modified structured file as an input to the machine learning model to produce a second malicious content classification, the second malicious content classification being made by the same machine learning model as the first malicious content classification and for the modified structured fil defined by the removal of that structured portion from the structured file;
determining, using the processor, a difference between the first malicious content classification and the second malicious content classification based on a distance measure;
identifying, using the processor, an impact of that structured portion on the first malicious content classification of the structured file based on the difference between the first malicious content classification and the second malicious content classification; and
storing, using the processor, an indication of the impact.

19. The method of claim 18, wherein the structured file is at least one of a Hypertext Markup Language (HTML) file, an Extensible Markup Language (XML) file, a Portable Executable (PE) file, a document processing file, or a Portable Document Format (PDF) file.

20. The method of claim 18, wherein the set of structured portions includes at least one of a Hypertext Markup Language (HTML) subtree or an Extensible Markup Language (XML) subtree.

21. The method of claim 18, further comprising:

ranking, using the processor, the set of structured portions based on the indication of the impact of each structured portion from the set of structured portions on the first malicious content classification; and identifying, based on the ranking, at least one structured portion from the set of structured portions as a malicious structured portion.

22. The method of claim 21, further comprising:

notifying, using the processor, a user of the at least one structured portion from the set of structured portions identified as a malicious structured portion.

23. The method of claim 18, further comprising:

ranking, using the processor, the set of structured portions based on the indication of the impact of each structured portion from the set of structured portions on the first malicious content classification.

24. The method of claim 18, wherein the distance measure is a first distance measure, the method further comprising:

for each structured portion from the set of structured portions:

calculating a difference based on a second distance measure between the indication of the set of features extracted from the modified structured file and the indication of the set of features extracted from the structured file, the identifying the impact of that structured portion on the first malicious content classification of the structured file based further on the difference.

25. The method of claim 18, further comprising:

defining the indication of the set of features extracted from the modified structured file by providing as an input to a hash function each feature from the set of features extracted from the modified structured file to produce the indication of the set of features extracted from the modified structured file.

* * * * *